United States Patent
Tiedemann et al.

(10) Patent No.: US 7,941,152 B2
(45) Date of Patent: May 10, 2011

(54) METHOD AND APPARATUS FOR A REVERSE LINK SUPPLEMENTAL CHANNEL SCHEDULING

(75) Inventors: Edward G. Tiedemann, San Diego, CA (US); Sai Yiu Duncan Ho, San Diego, CA (US); Jun Wang, San Diego, CA (US); Ragulan Sinnarajah, San Diego, CA (US); Ramin Rezaiifar, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 11/781,627

(22) Filed: Jul. 23, 2007

(65) Prior Publication Data
US 2007/0265014 A1 Nov. 15, 2007

Related U.S. Application Data

(63) Continuation of application No. 10/864,658, filed on Jun. 8, 2004, now Pat. No. 7,254,397, which is a continuation of application No. 10/170,950, filed on Jun. 12, 2002, now Pat. No. 6,799,043.

(51) Int. Cl.
*H04Q 7/20* (2006.01)

(52) U.S. Cl. ........ 455/450; 455/518; 455/519; 455/500; 455/517; 455/509; 370/310; 370/328; 370/329; 370/343

(58) Field of Classification Search .................. 455/518, 455/511, 512, 515, 516, 526, 403, 412.1, 455/412.2, 24, 445, 450, 451, 452.1, 452.2, 455/509; 370/310, 328, 329, 343, 313
See application file for complete search history.

(56) References Cited

U.S. PATENT DOCUMENTS
4,127,744 A * 11/1978 Yoshikawa et al. ........... 455/446
(Continued)

FOREIGN PATENT DOCUMENTS
CN 1291412 4/2001
(Continued)

OTHER PUBLICATIONS
International Search Report—Patent Cooperation Treaty—US02-38340 International Search Authority—Commissioner of Patents and Trademarks—Aug. 19, 2003.
(Continued)

*Primary Examiner* — Keith T Ferguson
(74) *Attorney, Agent, or Firm* — D. Scott Juneau

(57) ABSTRACT

An apparatus and method for communications of scheduling information of reverse link transmissions are disclosed. A base station controller determines scheduling of a reverse link supplemental channel transmission for a mobile station in a communication system (100). The base station controller groups the mobile station in a group of mobile stations and assigns a forward link channel assignment channel to the group of mobile stations. A transceiver (400) incorporates information relating to the determined scheduling in the assigned forward link common assignment channel and transmits the assigned forward link common assignment channel to the mobile station for scheduling the reverse link supplemental channel transmission. The mobile station receives the assigned forward link common assignment channel. The mobile station schedules transmission of the reverse link supplemental channel transmission in accordance with the determined scheduling and transmits the reverse link supplemental channel in accordance with the determined scheduling.

12 Claims, 6 Drawing Sheets

U.S. PATENT DOCUMENTS

| | | | |
|---|---|---|---|
| 5,603,096 A | 2/1997 | Gilhousen et al. | |
| 5,680,398 A | 10/1997 | Robinson | |
| 5,812,938 A | 9/1998 | Gilhousen | |
| 5,896,411 A | 4/1999 | Ali et al. | |
| 6,031,827 A | 2/2000 | Rikkinen et al. | |
| 6,188,910 B1 | 2/2001 | Park et al. | |
| 6,377,809 B1 | 4/2002 | Rezaiifar et al. | |
| 6,442,155 B1 | 8/2002 | Suk | |
| 6,542,481 B2 | 4/2003 | Foore | |
| 6,751,480 B2 * | 6/2004 | Kogiantis et al. | 455/562.1 |
| 6,799,043 B2 | 9/2004 | Tiedemann, Jr. et al. | |
| 2001/0021180 A1 * | 9/2001 | Lee et al. | 370/336 |
| 2003/0016737 A1 | 1/2003 | Wu et al. | |
| 2003/0048764 A1 | 3/2003 | Diep et al. | |
| 2003/0093530 A1 * | 5/2003 | Syed | 709/226 |
| 2004/0224712 A1 | 11/2004 | Tiedemann, Jr. et al. | |

FOREIGN PATENT DOCUMENTS

| | | |
|---|---|---|
| EP | 0974237 | 7/2008 |
| JP | 2001-274767 | 10/2001 |
| JP | 2001-320756 | 11/2001 |
| RU | 2126596 | 2/1999 |
| TW | 378481 | 1/2000 |
| TW | 391099 | 5/2000 |
| TW | 437249 | 5/2001 |
| WO | WO9914975 A2 | 3/1999 |
| WO | 0152448 | 7/2001 |
| WO | 0156314 | 8/2001 |

OTHER PUBLICATIONS

Supplementary European Search Report—EP02786832—European Search Authority—The Hague—Jan. 15, 2009.

* cited by examiner

METHOD AND APPARATUS FOR A REVERSE LINK SUPPLEMENTAL CHANNEL SCHEDULING

CROSS REFERENCE

Claim of Priority

The present application for patent is a Continuation and claims priority to patent application Ser. No. 10/864,658, entitled "Method and Apparatus for a Reverse Link Supplemental Channel Scheduling" filed Jun. 8, 2004, now allowed, which is a Continuation of U.S. Pat. No. 6,799,043, entitled "Method and Apparatus for a Reverse Link Supplemental Channel Scheduling" issued Sep. 28, 2004, which claims priority to U.S. Provisional Application Ser. No. 60/336,756 filed Dec. 4, 2001 entitled "Method and Apparatus for Using Forward Common Assignment Channel for Scheduling in a CDMA Communication System" and assigned to the assignee hereof and hereby expressly incorporated by reference herein.

FIELD

The present invention relates generally to the field of communications, and more particularly, to data communications in a communication system.

BACKGROUND

In a communication system, a base station may use time division access on a forward link transmission to a number of mobile stations in a code division multiple access communication system. Each mobile station is scheduled to receive a transmission during a time slot based on the forward link channel condition. The forward and reverse links channel conditions may change from time to time due to many different factors including mobility of the mobile stations. As a result, the channel condition between the base station and the mobile stations is also changing, creating a more favorable channel condition for a mobile station than another. The base station schedules the mobile stations reverse link transmissions. On the forward link, the base station needs to inform a mobile station when the mobile station is expected to transmit on a reverse link channel, such as a reverse link supplemental channel. The reverse link scheduling is based on many factors including the number of mobile stations that may transmit on the reverse link at the same time. The time between deciding the scheduling of a reverse link transmission for a mobile station and informing the mobile station on the forward link is desired to be as short as possible. The reverse link channel condition may change, for example, for a mobile station that is scheduled for transmission but not informed very quickly. When the scheduling information is received by the mobile station, the channel condition for the reverse link transmission for the mobile station may have deteriorated, thus leading to inefficient use of communication resources. The reverse link scheduling information, however, is transmitted on the forward link. The transmission on the forward link to a mobile station is based on the forward link channel condition with the mobile station. The mobile station may not have a good forward link channel condition; as a result, the mobile station may not receive a transmission on the forward link for some time. Therefore, there is a need for a method and apparatus for scheduling communications of data in a communication system.

SUMMARY

An apparatus and method for communications of scheduling information of reverse link transmissions in a timely manner are disclosed. A base station controller determines scheduling of a reverse link supplemental channel transmission for a mobile station in a communication system. The base station controller groups the mobile station in a group of mobile stations in the communication system. The base station controller assigns a forward link channel assignment channel to the group of mobile stations. A transmitter incorporates information relating to the determined scheduling in the assigned forward link common assignment channel. The transmitter transmits the assigned forward link common assignment channel to the mobile station for scheduling the reverse link supplemental channel transmission. A receiver in the mobile station receives the assigned forward link common assignment channel. A controller in the mobile station schedules transmission of the reverse link supplemental channel transmission from the mobile station in accordance with the determined scheduling. A transmitter in the mobile station transmits the reverse link supplemental channel in accordance with the determined scheduling.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Generally stated, a novel and improved method and apparatus provide for communications of reverse link supplemental channels scheduling information in a communication system. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
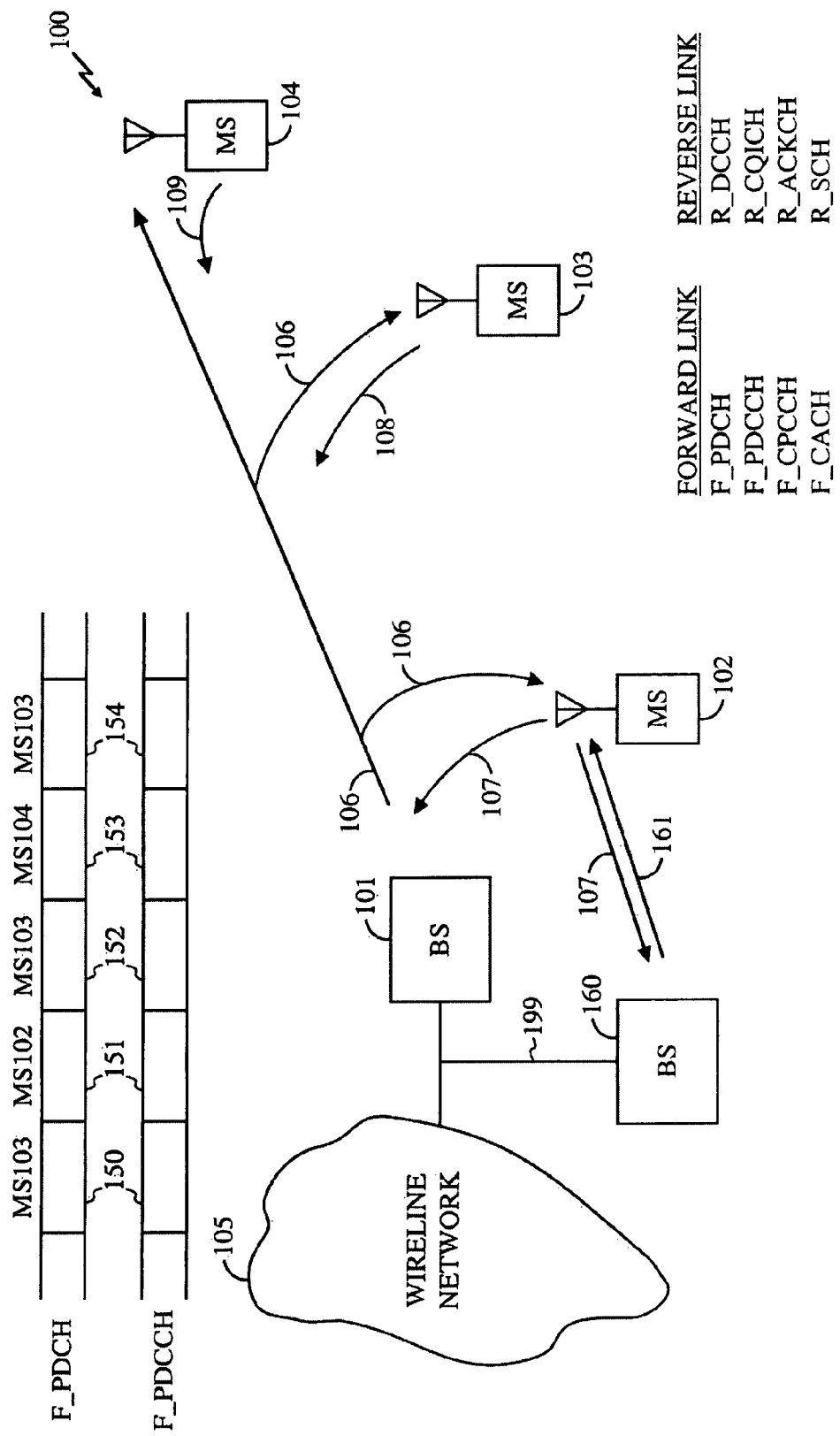
FIG. 1 illustrates a communication system capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102-104, and between the mobile stations 102-104 and a public switch telephone and data network 105. The mobile stations in FIG. 1 may be referred to as data access terminals (AT) and the base station as data access network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signals targeted for mobile stations 102-104 may be summed to form a forward link signal 106. Each of the mobile stations 102-104 receiving forward link signal 106 decodes the forward link signal 106 to extract the information that is targeted for its user. Base station 160 may also communicate with the mobile stations that are in its coverage area via a forward link signal transmitted from base station 160. The forward link signal transmitted from a base station may be conformed in accordance with a time division multiple access technique. As such, a mobile station may be assigned a time slot for receiving communication from the base station. The mobile stations may decode the received forward link to find whether any data is being communicated for its user. Mobile stations 102-104 communicate with base stations 101 and 160 via corresponding reverse links. Each reverse link is maintained by a reverse link signal, such as reverse link signals 107-109 for respectively mobile stations 102-104. The reverse link signals 107-109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102. The data rate and power level of the reverse and forward links may be maintained in accordance with the channel condition between the base station and the mobile station.

The transmissions on the forward links may be in accordance with a time division access scheme. The mobile stations in the coverage area continuously communicate channel quality indicator (CQI) information about the channel condition with each base station. A mobile station selects one of the base stations to transmit information on the forward link. The selection may be based on the quality of channel condition with the base station. The base station may be selected by a number of mobile stations. On the forward link, the base station may attempt to use a scheduling algorithm to schedule the forward link transmissions. For example, a mobile station that needs low data rate transmission at low power level may be served before a mobile station that needs high data rate and high power level transmission. Nevertheless, all mobile stations are attempted to be served on an equitable basis. In accordance with various aspects of the invention, a forward link common assignment channel (F-CACH) may be used for informing the mobile station about scheduling a reverse link supplemental channel transmission. The F-CACH may be assigned to a group of mobile stations at a time in accordance with various aspects of the invention. The F-CACH is at a lower data rate than other forward link data channel, exclusively at all times. As a result, the delay in informing the mobile station about the reverse link scheduling is maintained at a minimal level.

The forward link may include a number of channels. A forward link packet data channel (F-PDCH) may be used to transmit data and signaling data to the mobile station. F-PDCH may be transmitted over a 1.25 mSec time slot with a minimum of 384 bits and up to 3840 bits. If fewer than 384 bits are being transmitted, the time slot is padded with null data bits. The F-PDCH is also transmitted at the same time with a forward link packet data control channel (F-PDCCH). F-PDCCH is a control channel and transmitted over a 1.25 mSec time slot, and includes 21 data bits. The data rate of F-PDCCH is much lower than the minimum data rate of F-PDCH. The forward link also has a forward common power control channel (F-CPCCH) that controls the mobile stations reverse link power level. The reverse link has a dedicated control channel (R-DCCH) that is used for transmission of data and signaling information. A reverse link CQI channel (R-CQICH) is also used by the mobile station to indicate the forward link channel condition with a selected base station. The reverse link acknowledgment channel (R-ACKCH) is used by the mobile station to acknowledge proper reception of a data packet on the forward link. The F-PDCH and F-PDCCH are transmitted at the same time. For example, on the forward link, the MS 103 may be scheduled to receive data during time slots 150, 152 and 154, MS 102 during time slot 151, and MS 104 during time slot 153.

On the reverse link, a supplemental channel (R-SCH) may also be used by all mobile stations to transmit data to a base station. The R-SCH may be shared among all mobile stations, thus each mobile station may transmit during certain time slots of the R-SCH. The base station transmits the scheduling information on the F-CACH to inform which mobile station is allowed to use the R-SCH and at what time slots in accordance with various aspects of the invention. In addition, the communication system 100 may allow for a number of reverse link supplemental channels. A mobile station may be assigned to use a supplemental channel exclusively for a time period measured in units of time frame. One time frame may be 20 Msec long or equal to 16 time slots. The condition for transmitting on R-SCH may change very quickly. Once the base station decides to allow a mobile station to transmit on R-SCH, the scheduling information is sent on the forward link to the mobile station very quickly. In accordance with various aspects of the invention, the F-CACH may be used for scheduling the R-SCH.

Figure 2:
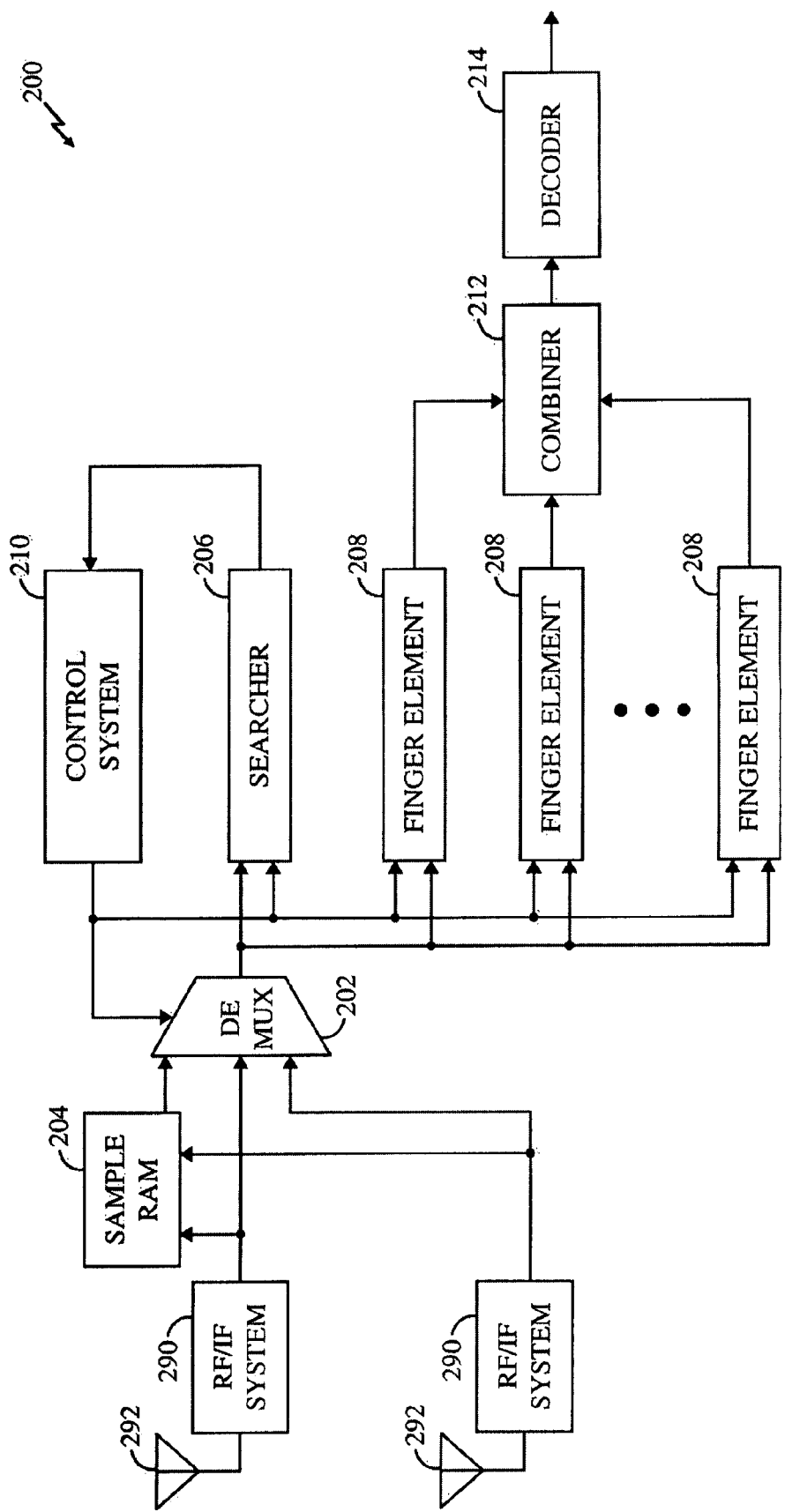
FIG. 2 illustrates a communication system receiver for receiving and decoding received packets of data in accordance with embodiments aspects of the invention.

FIG. 2 illustrates a block diagram of a receiver 200 used for processing and demodulating the received CDMA signal. Receiver 200 may be used for decoding the information on the reverse and forward links signals. Received (Rx) samples may be stored in RAM 204. Receive samples are generated by a radio frequency/intermediate frequency (RF/IF) system 290 and an antenna system 292. The RF/IF system 290 and antenna system 292 may include one or more components for receiving multiple signals and RF/IF processing of the received signals for taking advantage of the receive diversity gain. Multiple received signals propagated through different propagation paths may be from a common source. Antenna system 292 receives the RF signals, and passes the RF signals to RF/IF system 290. RF/IF system 290 may be any conventional RF/IF receiver. The received RF signals are filtered, down-converted and digitized to form RX samples at base band frequencies. The samples are supplied to a demultiplexer (demux) 202. The output of demux 202 is supplied to a searcher unit 206 and finger elements 208. A control unit 210 is coupled thereto. A combiner 212 couples a decoder 214 to finger elements 208. Control unit 210 may be a microprocessor controlled by software, and may be located on the same integrated circuit or on a separate integrated circuit. The decoding function in decoder 214 may be in accordance with a turbo decoder or any other suitable decoding algorithms.

During operation, received samples are supplied to demux 202. Demux 202 supplies the samples to searcher unit 206 and finger elements 208. Control unit 210 configures finger elements 208 to perform demodulation and despreading of the received signal at different time offsets based on search results from searcher unit 206. The results of the demodulation are combined and passed to decoder 214. Decoder 214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 200 may be used in a receiver portion of base stations 101 and 160 for processing the received reverse link signals from the mobile stations, and in a receiver portion of any of the mobile stations for processing the received forward link signals.

The channel quality with each base station may be based on a carrier to interference ratio (C/I) of the signal received from each base station. The pilot signal transmitted from each base station may be used to determine the C/I of the channel. Searcher 206 in connection with control system 210 may rank the channel condition of multiple base stations. Several of the base stations with good channel conditions may be selected to form an active set of base stations. The active set of base stations are capable of communicating with the mobile station at an acceptable level. The mobile station may select one of the base stations in the active set as the best candidate for transmitting data. The selection is communicated to the base stations on the R-CQICH. The base station controller via backhaul 199 directs the data to the selected base station for transmission to the mobile station on the forward link. The selected base station then schedules a transmission to the mobile station. Since several mobile stations may select the same base station, the base station attempts to schedule each mobile station based on a number of factors, such as the quality of the forward link channel condition, amount of data being transmitted, data rate and power level of transmission. For example, if a mobile station reported a low level channel quality and requires transmission of a lot of data, the mobile station is scheduled after another mobile station that requires transmission of a small amount data and reported a high level channel quality. In accordance with various aspects of the invention, since the F-CACH normally communicates at low data rate, the F-CACH may be used to transmit the scheduling information of the R-SCH. As a result, the scheduling information may be received on the F-CACH by the mobile station very quickly before the channel condition for transmission of the R-SCH changes. Receiver 200 may operate to decode the received F-CACH for retrieving the scheduling information. A transmitter transmits the R-SCH in accordance with the scheduling information.

Figure 3:
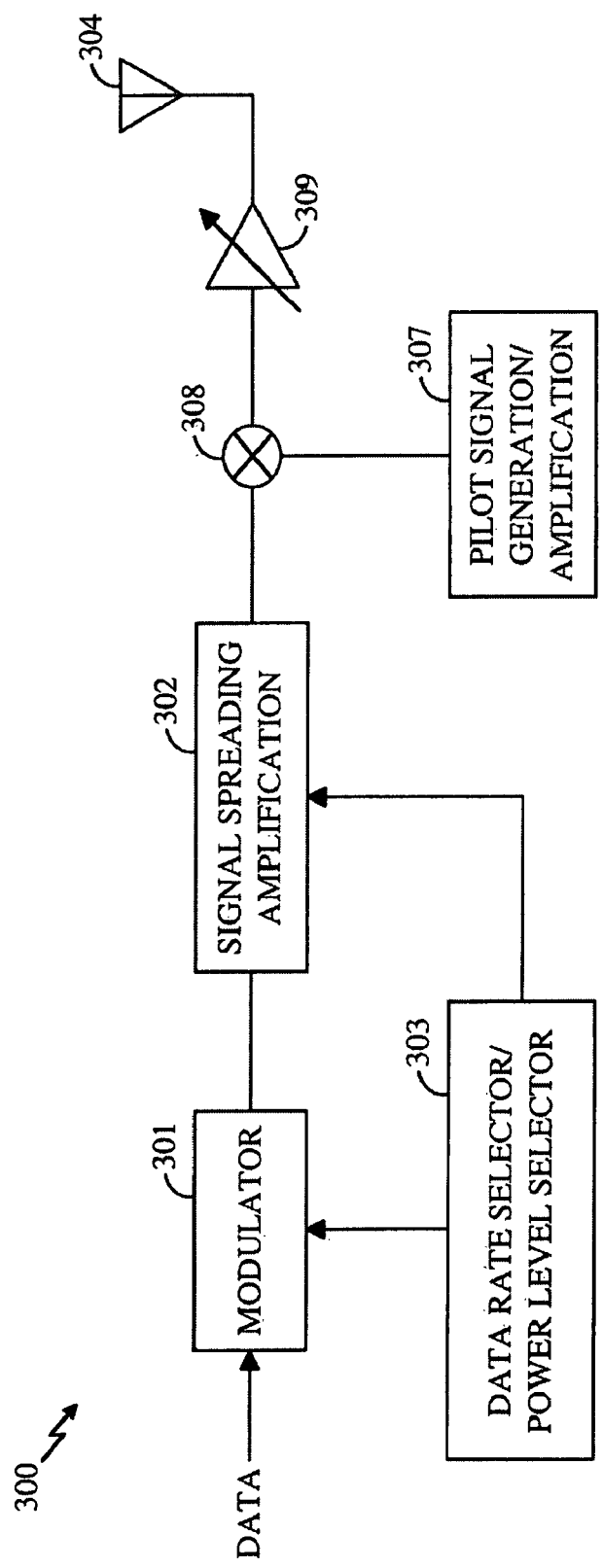
FIG. 3 illustrates a communication system transmitter for transmitting data packets in accordance with various embodiments of the invention.

FIG. 3 illustrates a block diagram of a transmitter 300 for transmitting the reverse and forward link signals. The channel data for transmission are input to a modulator 301 for modulation. The modulation may be according to any of the commonly known modulation techniques such as QAM, PSK or BPSK. The data is encoded at a data rate in modulator 301. The data rate may be selected by a data rate and power level selector 303. The data in each channel is also covered with a Walsh function. Each channel may be assigned a Walsh function. The data rate selection may be based on feedback information received from a receiving destination. The feedback information may include the maximum allowed data rate. The maximum allowed data rate may be determined in accordance with various commonly known algorithms. The maximum allowed data rate very often is based on the channel condition, among other considered factors. The data rate and power level selector 303 accordingly selects the data rate in modulator 301. The output of modulator 301 passes through a signal spreading operation and amplified in a block 302 for transmission from an antenna 304. The data rate and power level selector 303 also selects a power level for the amplification level of the transmitted signal in accordance with the feedback information. The combination of the selected data rate and the power level allows proper decoding of the transmitted data at the receiving destination. A pilot signal is also generated in a block 307. The pilot signal is amplified to an appropriate level in block 307. The pilot signal power level may be in accordance with the channel condition at the receiving destination. The pilot signal is combined with the channel signal in a combiner 308. The combined signal may be amplified in an amplifier 309 and transmitted from antenna 304. The antenna 304 may be in any number of combinations including antenna arrays and multiple input multiple output configurations. The transmitter 300 may be incorporated in a mobile station or a base station. As such, the transmitter 300 in a mobile station transmits the R-SCH in accordance with the scheduling information. The transmitter 300 may be used in a base station for transmitting the F-CACH.

Figure 4:
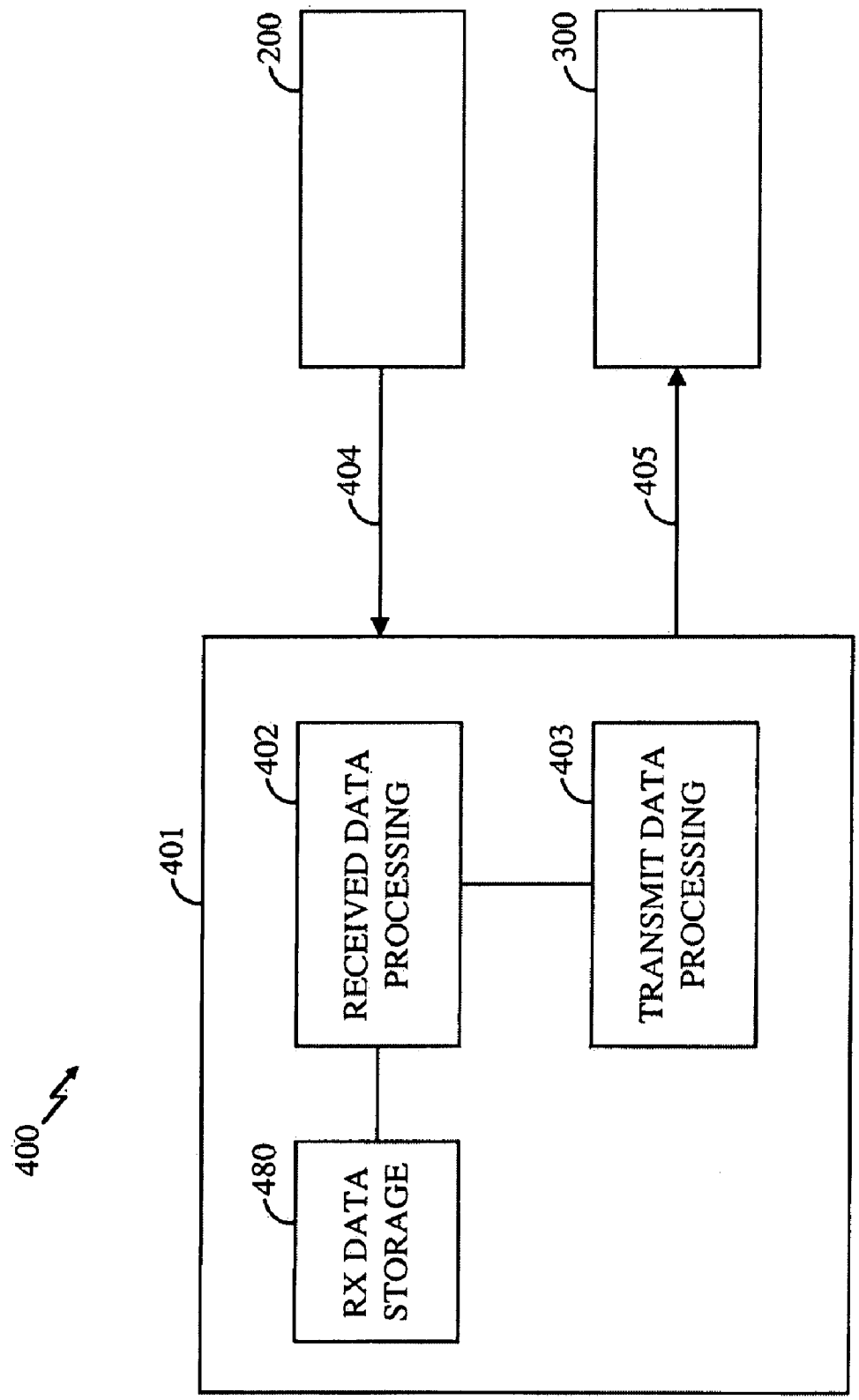
FIG. 4 illustrates a transceiver system capable of operating in accordance with various embodiments of the invention.

FIG. 4 depicts a general diagram of a transceiver system 400 for incorporating receiver 200 and transmitter 300 for maintaining a communication link with a destination. The transceiver 400 may be incorporated in a mobile station or a base station. The transceiver 400 may be used to receive the F-CACH for decoding the scheduling information, and transmitting on the R-SCH in accordance with the received scheduling information. The transceiver 400 may also be used in a base station for transmitting the F-CACH. A processor 401 may be coupled to receiver 200 and transmitter 300 to process the received and transmitted data. Various aspects of the receiver 200 and transmitter 300 may be common, even though receiver 200 and transmitter 300 are shown separately. In one aspect, receiver 200 and transmitter 300 may share a common local oscillator and a common antenna system for RF/IF receiving and transmitting. Transmitter 300 receives the data for transmission on input 405. Transmit data processing block 403 prepares the data for transmission on a transmit channel. The processor 401 through the transmit data processing block 403 may schedule transmission of data to various mobile stations on the forward link. Received data, after being decoded in decoder 214, are received at processor 401 at an input 404. Received data are processed in received data processing block 402 in processor 401. The processing of the received data generally includes checking for error in the received packets of data. For example, if a received packet of data has error at an unacceptable level, the received data processing block 402 sends an instruction to transmit data processing block 403 for making a request for retransmission of the packet of data. The request is transmitted on a transmit channel, such as on the R-ACKCH. A receive data storage unit 480 may be utilized to store the received packets of data.

Various operations of processor 401 may be integrated in a single or multiple processing units. The transceiver 400 may be incorporated in a mobile station. The transceiver 400 may be connected to another device. The transceiver 400 may be an integral part of the device. The device may be a computer or operates similar to a computer. The device may be connected to a data network, such as Internet. In case of incorporating the transceiver 400 in a base station, the base station through several connections may be connected to a network, such as Internet.

Figure 5:
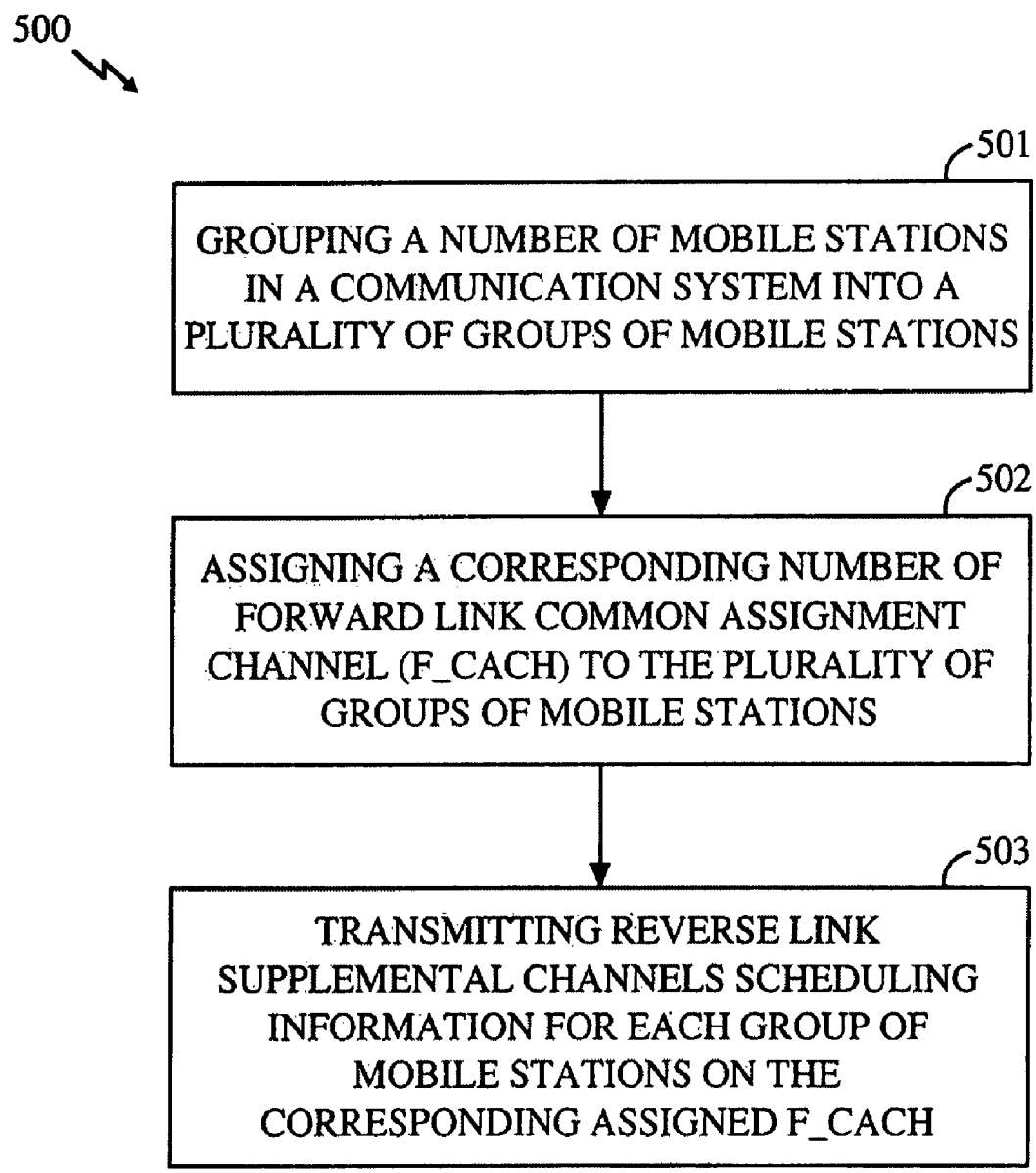
FIG. 5 illustrates various steps for transmitting a reverse link supplemental channel scheduling information for each mobile station in a group of mobile stations in a communication system in accordance with various embodiments of the invention.

For scheduling a R-SCH transmission, various aspects of the invention may be more apparent by referring to FIG. 5 illustrating various steps of a flow diagram 500. At step 501, base station 101 or 160 may group a number of mobile stations in the communication system 100 into a plurality of groups of mobile stations. The grouping may be performed in a manner consistent with various aspects of the invention. For example, upon registration to the base station, the base station assigns the mobile station to one of the groups. At step 502, a corresponding number of F-CACHs are assigned to the plurality of groups of mobile stations. For example, the communication system 100 may have three F-CACHs. Each channel is assigned to a group of mobile stations. At step 503, the base station transmits the R-SCH scheduling information for each group of mobile stations on the corresponding assigned F-CACH in accordance with various aspects of the invention.

Figure 6:
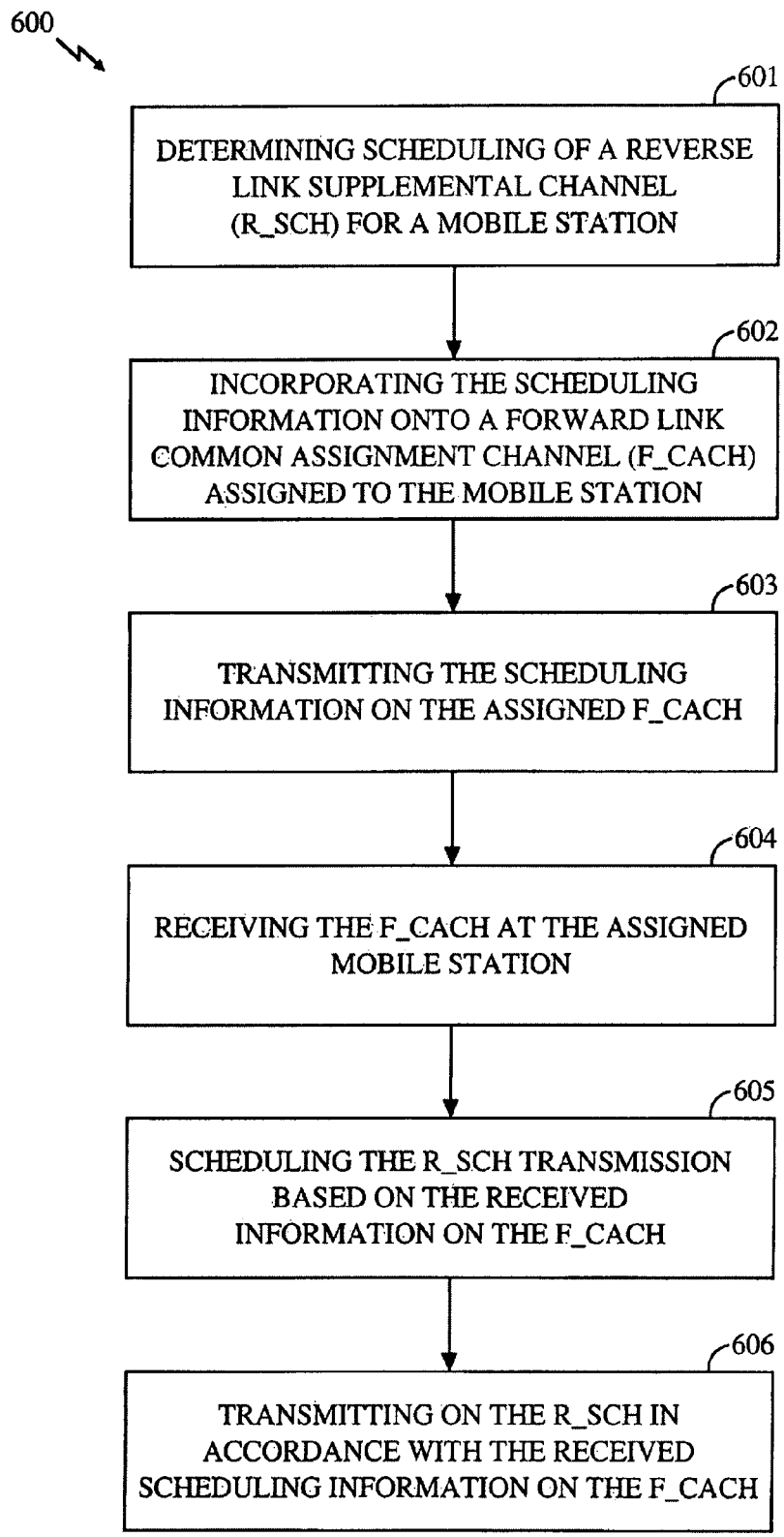
FIG. 6 illustrates various steps for transmitting a reverse link supplemental channel scheduling information for a mobile station in a communication system in accordance with various embodiments of the invention.

Referring to FIG. 6, a flow chart 600 illustrates scheduling of the R-SCH in accordance with various aspects of the invention. At step 601, the base station may determine scheduling a transmission on the R-SCH for a mobile station. Once a mobile station exhibits good reverse link channel condition, the base station needs to inform the mobile station very quickly about the R-SCH scheduling before the reverse link channel condition changes. At step 602, the base station incorporates the scheduling information onto the F-CACH. The F-CACH is assigned to the mobile station in accordance with various steps described in relation to flow chart 500. At step 603, the base station transmits the scheduling information on the F-CACH to the mobile station. At step 604, the mobile station receives the scheduling information on the assigned F-CACH. At step 605, the mobile station schedules the transmission of R-SCH based on the received scheduling information. At step 606, the mobile station transmits on the R-SCH in accordance with the received scheduling information of the assigned F-CACH. Therefore, the mobile station receives the scheduling information very quickly, and is able to schedule the reverse link transmission before the channel condition for the reverse link changes very drastically.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method, comprising:
   grouping a number of wireless communicators into a plurality of groups of wireless communicators;
   assigning a corresponding number of common assignment channels to said plurality of groups of wireless communicators; and
   transmitting supplemental channel scheduling information on said corresponding number of common assignment channels assigned to said plurality of groups of wireless communicators.

2. A method as recited in claim 1, wherein the corresponding number of common assignment channels have a data rate lower than data channels.

3. The method of claim 1, wherein the supplemental channel scheduling information designates a manner by which transmissions are scheduled on a supplemental channel.

4. The method of claim 3, wherein the supplemental channel is a shared channel that is shared by each wireless communicator in each of the plurality of groups.

5. The method of claim 4, wherein the supplemental channel scheduling information indicates when each of the wireless communicators within each of the plurality of groups is permitted to transmit upon a reverse-link supplemental channel.

6. The method of claim 5, wherein the supplement channel scheduling information assigns non-overlapping timeslots within the reverse-link supplemental channel to each of the wireless communicators within each of the plurality of groups.

7. An apparatus, comprising:
   a base station controller for grouping a number of wireless communicators into a plurality of groups of wireless communicators, and for assigning a corresponding number of common assignment channels to said plurality of groups of wireless communicators; and
   a transmitter for transmitting supplemental channel scheduling information on said corresponding number of common assignment channels assigned to said plurality of groups of wireless communicators.

8. An apparatus as recited in claim 7, wherein the corresponding number of common assignment channels have a data rate lower than data channels.

9. An apparatus, comprising:
   means for grouping a number of wireless communicators into a plurality of groups of wireless communicators;
   means for assigning a corresponding number of common assignment channels to said plurality of groups of wireless communicators; and
   means for transmitting supplemental channel scheduling information on said corresponding number of common assignment channels assigned to said plurality of groups of wireless communicators.

10. An apparatus as recited in claim 9, wherein the corresponding number of common assignment channels has a data rate lower than data channels.

11. A computer-readable storage medium comprising instructions, which, when executed by an apparatus, cause the apparatus to perform operations, the instructions comprising:
    program code to group a number of wireless communicators into a plurality of groups of wireless communicators;
    program code to assign a corresponding number of common assignment channels to said plurality of groups of wireless communicators; and
    program code to transmit supplemental channel scheduling information on said corresponding number of common assignment channels assigned to said plurality of groups of wireless communicators.

12. A computer-readable storage medium as recited in claim 11, wherein the corresponding number of common assignment channels have a data rate lower than data channels.

* * * * *